(12) United States Patent
Kim et al.

(10) Patent No.: US 7,657,088 B2
(45) Date of Patent: Feb. 2, 2010

(54) METHOD AND APPARATUS OF COLOR SYSTEM ADAPTIVE INTENSITY COMPENSATION AND VIDEO ENCODING/DECODING METHOD AND APPARATUS THEREOF

(75) Inventors: Wooshik Kim, Yongin-si (KR); Hyun Mun Kim, Seongnam-si (KR); Daesung Cho, Seoul (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 724 days.

(21) Appl. No.: 11/384,447

(22) Filed: Mar. 21, 2006

(65) Prior Publication Data
US 2007/0014479 A1 Jan. 18, 2007

(30) Foreign Application Priority Data
Jul. 15, 2005 (KR) .................... 10-2005-0064288

(51) Int. Cl.
*G06K 9/00* (2006.01)
*G06K 9/36* (2006.01)
*G06K 9/46* (2006.01)
(52) U.S. Cl. ...................... 382/167; 382/238
(58) Field of Classification Search ................ 382/162, 382/164, 167, 173, 232, 233, 238, 239, 254, 382/266; 358/515, 518, 523, 525, 530; 345/589, 345/600–604; 375/240.03, 240.12, 240.16
See application file for complete search history.

(56) References Cited
U.S. PATENT DOCUMENTS
5,365,603 A * 11/1994 Karmann .................... 382/291
6,185,340 B1 * 2/2001 Comer ....................... 382/236
6,292,588 B1 * 9/2001 Shen et al. .................. 382/238
6,360,017 B1 * 3/2002 Chiu et al. .................. 382/239
6,366,703 B1 * 4/2002 Boon et al. ................. 382/238
7,248,747 B2 * 7/2007 Loew ......................... 382/254
7,330,509 B2 * 2/2008 Lu et al. ................ 375/240.03
2006/0098881 A1 * 5/2006 Kim .......................... 382/238
2006/0098884 A1 * 5/2006 Kim .......................... 382/240
2007/0014479 A1 * 1/2007 Kim et al. ................... 382/238

* cited by examiner

*Primary Examiner*—Amir Alavi
(74) *Attorney, Agent, or Firm*—Staas & Halsey LLP

(57) ABSTRACT

A method and apparatus for encoding and/or decoding image data. The encoding method includes: if the color space of an image is a single color space, correcting pixel values by applying identical correction pixel values to all color components of a previous image, and if the color space of the image is not a single color space, correcting pixel values by applying different correction pixel values to the color components of the previous image; performing temporal prediction encoding of a current image by using the corrected pixel values of the previous image; quantizing the prediction encoded data; and generating a bitstream by entropy encoding the quantized data. According to the method and apparatus, when the pixel values of a previous image are desired to be corrected in order to perform temporal prediction encoding, different pixel value correction methods are applied according to whether or not the characteristics of color components included in the color space of the image desired to be encoded. By doing so, when image data is encoded, the encoding can be performed adaptively to a variety of color spaces and higher compression efficiency can be maintained.

63 Claims, 6 Drawing Sheets ation No. 10-2005-0064288, filed on Jul. 15, 2005, in the
METHOD AND APPARATUS OF COLOR SYSTEM ADAPTIVE INTENSITY COMPENSATION AND VIDEO ENCODING/DECODING METHOD AND APPARATUS THEREOF

CROSS-REFERENCE TO RELATED APPLICATION

This application claims the benefit of Korean Patent Application No. 10-2005-0064288, filed on Jul. 15, 2005, in the Korean Intellectual Property Office, the disclosure of which is incorporated herein by reference.

BACKGROUND OF THE INVENTION

1. Field of the Invention

The present invention relates to a method and apparatus for encoding and/or decoding image data, and more particularly, to an image encoding and/or decoding method and apparatus for performing temporal prediction encoding by correcting the pixel values of a previous image in order to increase encoding efficiency.

2. Description of Related Art

When an image is taken by a camera, the image generally has an RGB (red, green, blue) color space. This RGB image is used after converting the color space to fit each application field. As a color space that has been generally widely used in the video compression field, there is a YCbCr color space. Here, Y indicates a luma component and Cb and Cr indicate chroma components. However, since there is a limit to expression of a high picture quality in the YCbCr, an RGB color space or an XYZ color space is used in order to express a high picture quality.

Meanwhile, when moving pictures are compressed, temporal prediction encoding is performed, in which a current image is subtracted from a previous image and the result is encoded. At this time, the compression efficiency can be increased by performing prediction encoding more accurately with values obtained by modifying pixel values of the previous image by using a predetermined weight value. Here, the method of modifying the pixel values of the previous image is referred to as pixel value correction.

In the conventional image compression, when a series of images continuous with respect to time are encoded, the images are compressed through temporal prediction in order to remove redundant information between the previous image and the current image. In the Society of Motion Picture and Television Engineers (SMPTE) Standard for Television: VC-1 Compressed Video Bitstream Format and Decoding Process (VC-1) that has been undergoing standardization recently, a variety of temporal prediction methods are provided. Among the methods, there is a pixel value correction method in which the value of a previous image is multiplied by or added to a predetermined value and then by using the resultant value, a current image is encoded. By using this method, the efficiency of the temporal prediction method can be increased to enhance the compression ratio.

However, in the pixel value correction method used in the VC-1, the YCbCr color space is used as a fixed one. Though the YCbCr has been generally widely used for video encoding, the YCbCr has a limit to picture quality that can be expressed. When gradually increasing demands for high picture quality images are considered, a pixel value correction method adaptive to a color space is required so that an identical method can be used to an image using a color space other than the YCbCr color space.

BRIEF SUMMARY

An aspect of the present invention provides a pixel value correction method and apparatus adaptive to the color space of an image in an image data encoding and/or decoding method.

An aspect of the present invention also provides an image encoding and/or decoding method and apparatus using the pixel value correction method and apparatus.

According to an aspect of the present invention, there is provided an image pixel value correction method of correcting the pixel value of a previous image in order to perform temporal prediction encoding of a current image, the method including: correcting the pixel value of a first color component among pixel values of the previous image, by using a first proportional constant and a first offset value; determining whether or not the color space of the image is a single color space; and if the color space of the image is a single color space, correcting a pixel value corresponding to a color component other than the first color component, by using the first proportional constant and the first offset value, and if the color space of the image is not a single color space, correcting a pixel value corresponding to a color component other than the first color component, by using a second proportional constant and a second offset value, wherein the single color space is a color space in which each of color components includes both a chroma component and a luma component. The second proportional constant may be different from the first proportional constant, and the second offset value may be different from the first offset value.

If the color space of the image is any one of YCbCr and YUV color spaces, the first color component may be the Y component, and if the color space of the image is an RGB color space, the first color component may be the G component.

In the determining of whether or not the color space of the image is a single color space, information on whether or not the color space of the image is a single color space may be input by a user, or the color space of the image may be input by a user and it may be determined whether or not the color space of the image is a single color space is input by a user.

In the determining of whether or not the color space of the image is a single color space, if the color space of the image is an RGB color space, it may be determined that the color space of the image is a single color space, and if the color space of the image is any one of YCbCr and YUV color spaces, it may be determined that the color space of the image is not a single color space.

The correcting of the pixel value of the first color component may include: generating correction pixel values by using the first proportional constant and the first offset value; and by using the correction pixel values generated by using the first proportional constant and the first offset value, correcting the pixel value of the first color component.

In the correcting of the pixel value of the color component other than the first color component, if the color space of the image is a single color space, the pixel value of the color component other than the first color component may be corrected by using the correction pixel values generated by using the first proportional constant and the first offset value.

The correcting of the pixel value of the color component other than the first color component, if the color space of the image is not a single color space, may include: generating correction pixel values by using the second proportional constant and the second offset value; and correcting the pixel value of the color component other than the first color component, by using the correction pixel values generated by using the second proportional constant and the second offset value.

According to another aspect of the present invention, there is provided an image pixel value correction apparatus of correcting the pixel value of a previous image in order to perform temporal prediction encoding of a current image, the apparatus including: a first correction value generation unit generating correction pixel values by using a first proportional constant and a first offset value; a color space determination unit determining whether or not the color space of the image is a single color space; a second correction value generation unit, if the color space of the image is not a single color space, generating correction pixel values by using a second proportional constant and a second offset value; and a pixel value replacement unit, if the color space of the image is a single color space, replacing the pixel values of all the color components of the previous image, with the correction pixel values generated in the first correction value generation unit, and if the color space of the image is not a single color space, replacing the pixel values of the first color component with the correction pixel values generated in the first correction value generation unit and replacing the pixel values of the color components other than the first color component with the correction pixel values generated in the second correction value generation unit.

According to still another aspect of the present invention, there is provided an image encoding method of encoding an image by using temporal prediction encoding, the method including: if the color space of an image is a single color space, correcting pixel values by applying identical correction pixel values to all color components of a previous image, and if the color space of the image is not a single color space, correcting pixel values by applying different correction pixel values to the color components of the previous image; performing temporal prediction encoding of a current image by using the corrected pixel values of the previous image; quantizing the prediction encoded data; and generating a bitstream by entropy encoding the quantized data.

According to yet still another aspect of the present invention, there is provided an image encoding apparatus for encoding an image by using temporal prediction encoding, the apparatus including: a pixel value correction unit, if the color space of an image is a single color space, correcting pixel values by applying identical correction pixel values to all color components of a previous image, and if the color space of the image is not a single color space, correcting pixel values by applying different correction pixel values to the color components of the previous image; a temporal prediction unit performing temporal prediction encoding of a current image by using the corrected pixel values of the previous image; a quantization unit quantizing the prediction encoded data; and an entropy encoding unit generating a bitstream by entropy encoding the quantized data.

According to a further aspect of the present invention, there is provided an image decoding method of decoding an image from an input bitstream, the method including: entropy decoding the bitstream; inverse quantizing the entropy decoded data; if the color space of an image is a single color space, correcting pixel values by applying identical correction pixel values to all color components of a previous image, and if the color space of the image is not a single color space, correcting pixel values by applying different correction pixel values to the color components of the previous image; and by using the corrected pixel values of the previous image, performing temporal prediction decoding of data corresponding to a current image among the inverse quantized data.

According to an additional aspect of the present invention, there is provided an image decoding apparatus of decoding an image from an input bitstream, the method including: an entropy decoding unit entropy decoding the bitstream; an inverse quantization unit inverse quantizing the entropy decoded data; a pixel value correction unit, if the color space of an image is a single color space, correcting pixel values by applying identical correction pixel values to all color components of a previous image, and if the color space of the image is not a single color space, correcting pixel values by applying different correction pixel values to the color components of the previous image; and a temporal prediction decoding unit, performing temporal prediction decoding of data corresponding to a current image among the inverse quantized data, by using the corrected pixel values of the previous image.

According to an additional aspect of the present invention, there are provided computer readable recording media having embodied thereon computer programs for executing the pixel value correction methods or the image data encoding and/or decoding methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
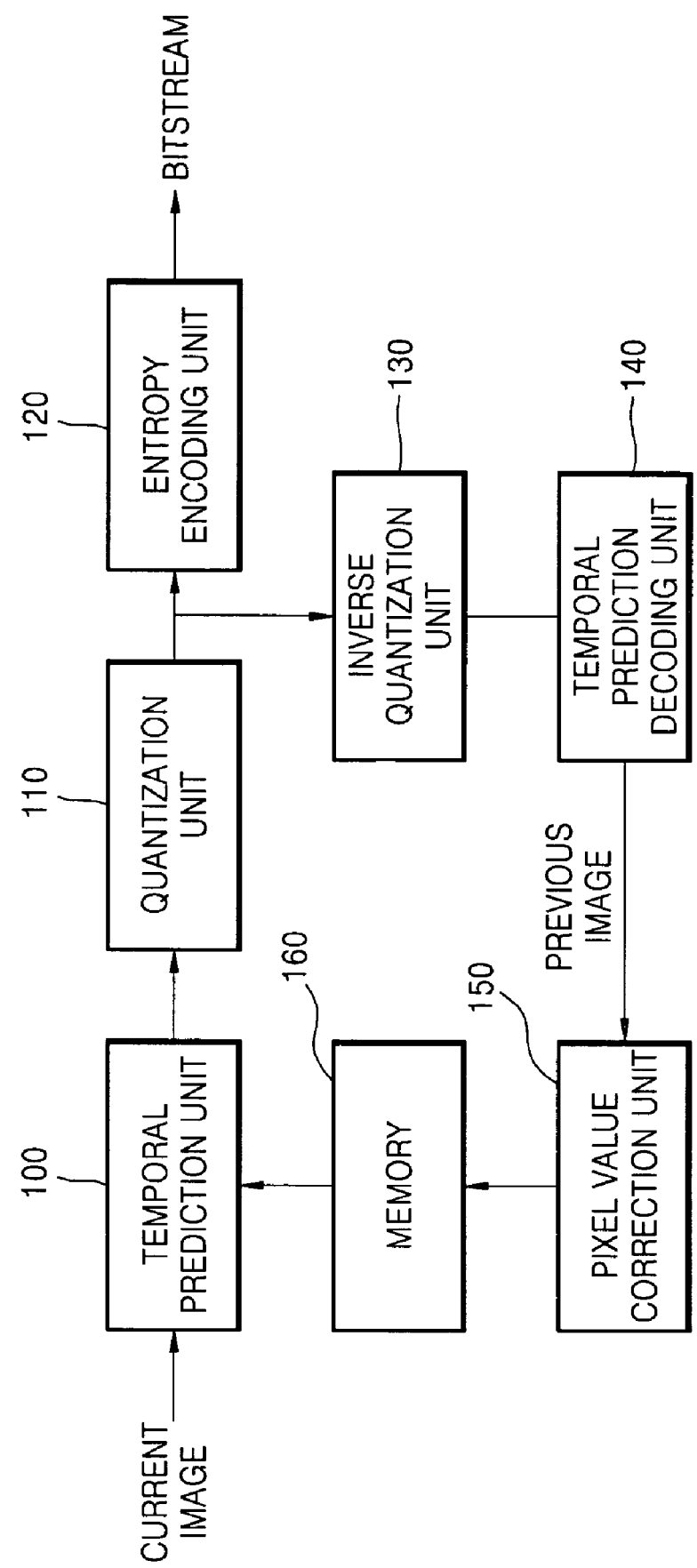
FIG. 1 is a block diagram showing a structure of an image encoding apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram showing a structure of an image encoding apparatus according to an embodiment of the present invention.

The image encoding apparatus of FIG. 1 includes a temporal prediction unit 100, a quantization unit 110, an entropy encoding unit 120, an inverse quantization unit 130, a temporal prediction decoding unit 140, a pixel value correction unit 150, and a memory 160.

The temporal prediction unit 100 extracts a block similar to a block that is currently desired to be encoded, among previous images stored in the memory 160, and encodes the difference of the pixel value of the extracted previous image and the pixel value of the current image block. The quantization unit 110 quantizes the temporally predicted data and the entropy encoding unit 120 generates a bitstream by performing lossless encoding of the quantized data and encoding information.

The data output from the temporal prediction unit 100 may pass through a frequency domain transform operation, such as a discrete cosine transform (DCT), before the quantization. The inverse quantization unit 30 inverse quantizes the quantized data output from the quantization unit 110, and the temporal prediction decoding unit 140 restores an image by adding the prediction value used in the temporal prediction operation, to the inverse quantized data. If the frequency domain transform, such as the DCT, is performed before the quantization in the encoding, inverse frequency domain transform of the inverse quantized data may be performed. The pixel value correction unit 150 corrects the pixel values of the restored image and stores the correct image pixel values in the memory 160 in order to use the values in the temporal prediction of a next image.

Figure 3:
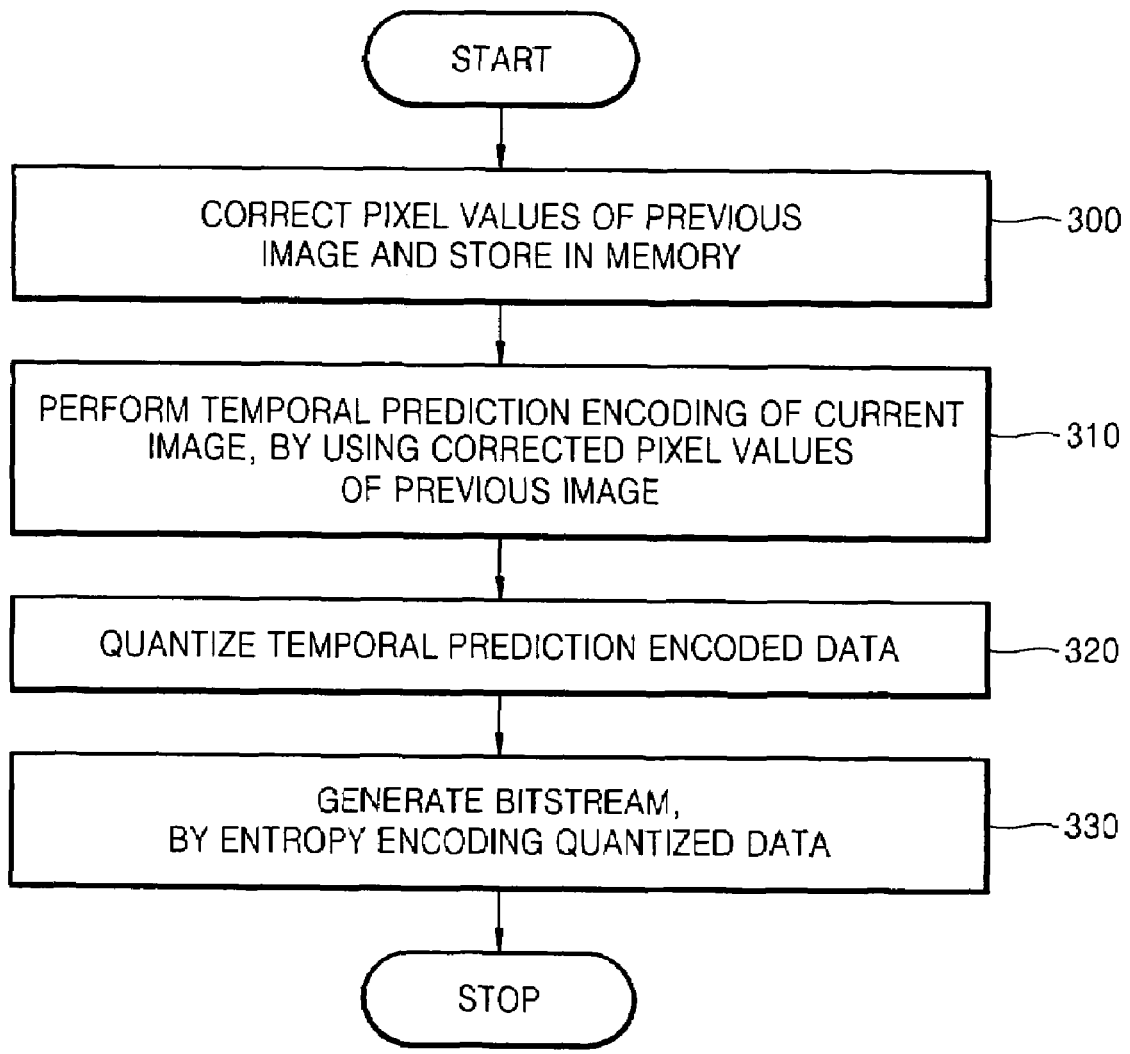
FIG. 3 is a flowchart of an image encoding method according to an embodiment of the present invention.

FIG. 3 is a flowchart of an image encoding method according to an embodiment of the present invention, which will now be explained with reference to FIG. 1. The pixel value correction unit 150 corrects the pixel value of the previous image output from the temporal prediction decoding unit 140 and stores the values in the memory 160 in operation 300. The temporal prediction unit 100 extracts a block similar to the current image block desired to be encoded, among previous images stored in the memory 160, and by using the difference of the pixel value of the extracted previous image block and the pixel value of the current image block, performs temporal prediction encoding of the current image block in operation 310.

The quantization unit 110 quantizes the temporally predicted data in operation 320, and the entropy encoding unit 120 generates a bitstream by performing lossless encoding of the quantized data and encoding information in operation 330.

Figure 2:
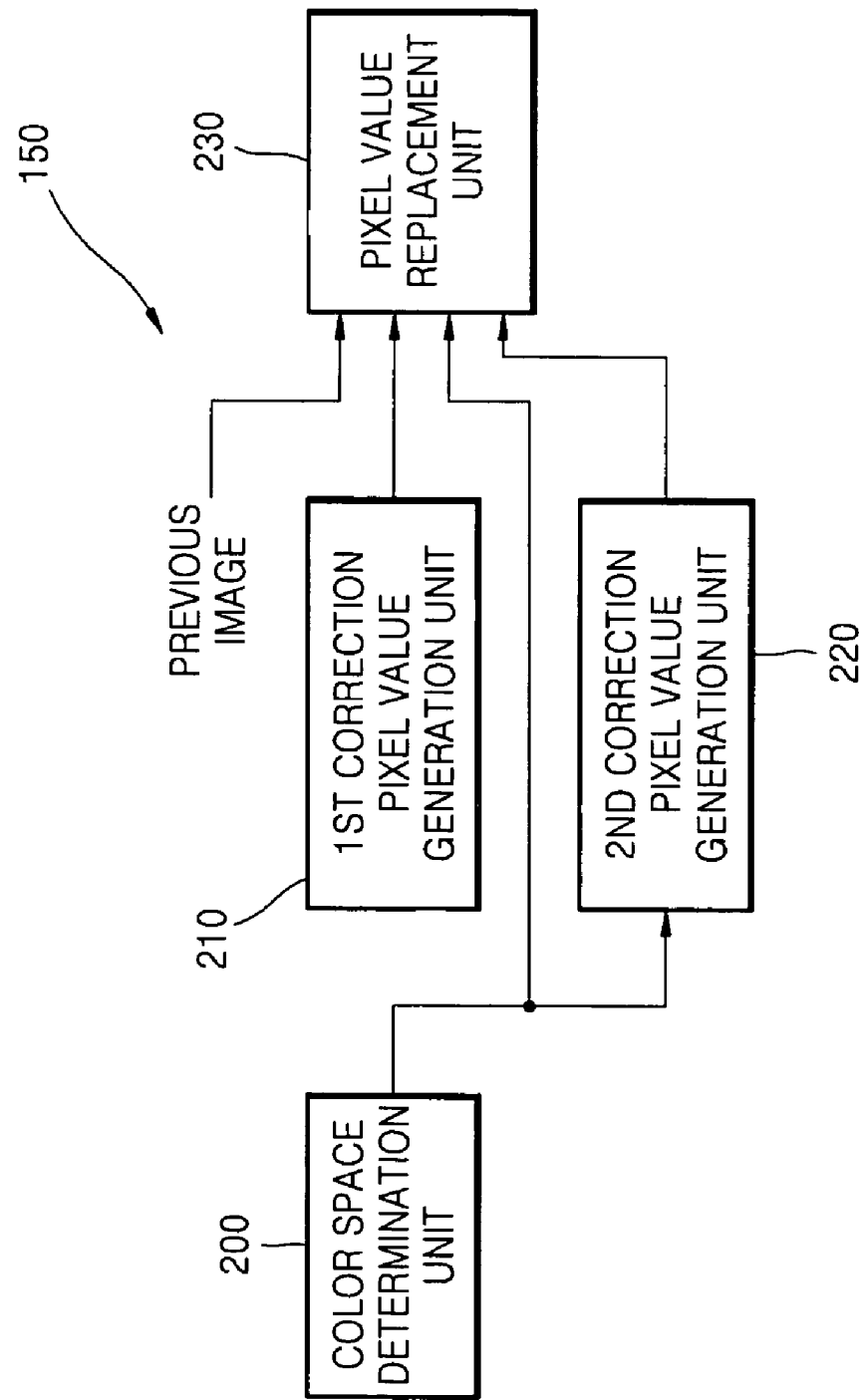
FIG. 2 is a block diagram of a pixel value correction unit of FIG. 1 according to an embodiment of the present invention.
Figure 4:
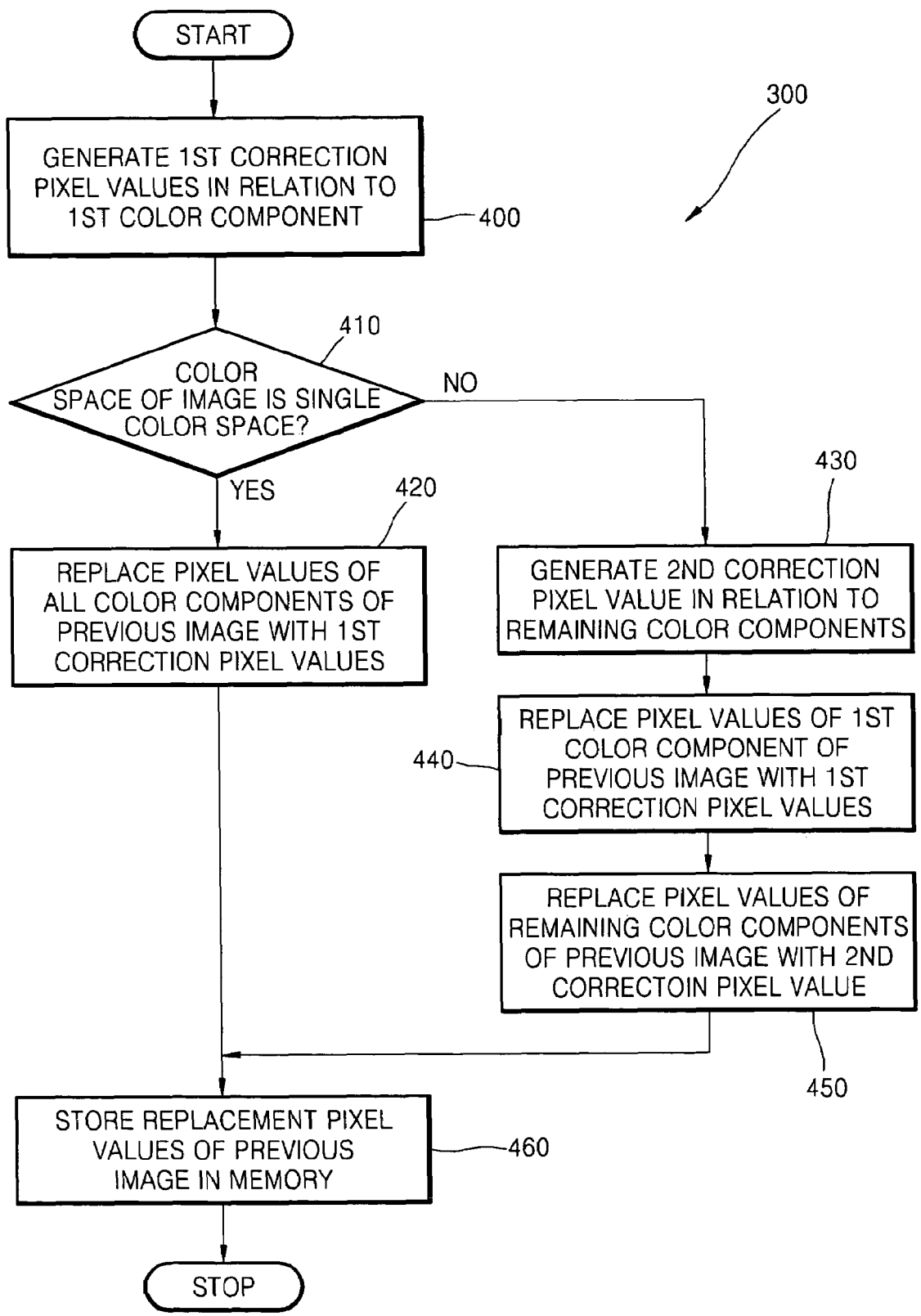
FIG. 4 is a flowchart of a pixel value correction operation of FIG. 3 according to an embodiment of the present invention.

FIG. 2 is a block diagram of a pixel value correction unit of FIG. 1 according to an embodiment of the present invention. The pixel value correction unit 150 of FIG. 2 includes a color space determination unit 200, a first correction pixel value generation unit 210, a second correction pixel value generation unit 220, and a pixel value replacement unit 230. The operation of the pixel value correction unit 150 of FIG. 2 will now be explained with reference to the flowchart shown in FIG. 4.

With respect to a first color component that is a reference among color components included in the color space of the image, the first correction pixel value generation unit 210 generates correction pixel values by calculating according to the following equation 1 in operation 400. If the color space is an RGB, the first color component that is the reference may be the G color component, and if the color space is a YCbCr or YUV, the first color component may be the Y color component.

$$Y = SX + C \quad (1)$$

Here, S is a proportional constant, C is an offset value, X is a pixel value desired to be corrected, and Y is a corrected pixel value. The proportional constant S and offset value C may be preset by a user. Also, information on the applied proportional constant S and offset value C may be included in the bitstream generated by the entropy encoding unit 120.

The color space determination unit 200 determines whether the color space of an image desired to be encoded is a single color space or a complex color space in operation 410. In the single color space, color components included in the color space have similar characteristics. That is, each of the color components has a luma component and a chroma component. Since in the RGB color space each of the R, G, and B color components has a luma component and a chroma component, it may be determined that the RGB color space is a single color space.

In the complex color space, color components included in the color space have characteristics different to each other. Since in the YCbCr color space, the Y color component has a luma component, and the Cb and Cr color components have chroma information, it may be determined that the YCbCr color space is a complex color space. Also, since the YUV color space the characteristics of the Y, U, and V color components are different to each other, it may be determined that the YUV color space is a complex color space.

The color space determination unit 200 may determine the characteristic of the color space of the image, by receiving in input from the user of information on whether the color space of the image desired to be encoded is a single color space or a complex color space. Also, the color space determination unit 200 may match each of a variety of color spaces with information on whether the color space is a single color space or a complex color space, in advance and store the color spaces and corresponding information. Then, by receiving the name of the color space of an image desired to be encoded from the user, and using the stored information corresponding to the name, the color space determination unit 200 may determine whether the color space of the image is a single color space or a complex color space. The information on whether the image is a single color space or a complex color space may be included in the bitstream generated in the entropy encoding unit 120.

If the image desired to be encoded is a single color space, the pixel value replacement unit 230 replaces pixel values of each of all color components of the previous image with the correction pixel values generated in relation to the first color component in operation 420. For example, in the case of the RGB color space, by applying the correction pixel values generated in relation to the G color component by the first correction pixel value generation unit 210, to all the pixel values of the R, G, and B color components of the previous image, the pixel values are replaced by the correction pixel values.

If the image desired to be encoded is a complex color space, the second correction pixel value generation unit 220 generates second correction pixel values in relation to the color components other than the first color component, by calculating the equation 1 in operation 430. The proportional constant S and offset value C used to generate the second correction pixel values may be different from the proportional constant S and offset value C, respectively, used to generate the first correction pixel values.

The pixel value replacement unit 230 replaces the pixel values in relation to the first color component of the previous image with the generated first correction pixel values in operation 440, and replaces the pixel values in relation to the color components other than the first color component of the previous image with the generated second correction pixel values in operation 450. For example, in the case of the YCbCr color space, the pixel values of the Y color component of the previous image may be replaced with the first correction pixel values, and the Cr and Cb pixel values of the previous image may be replaced with the second correction pixel values.

The pixel value replacement unit 230 stores the replacement pixel values of the previous image in the memory 160 in operation 460.

An example of a pseudo code showing a method of generating the first correction pixel values and the second correction pixel values follows:

```
if (LUMSCALE == 0)
{
    iScale = - 64
    iShift = MAX * 64 - LUMSHIFT *2 * 64
    if (LUMSHIFT > 31)
        iShift += HALF * 64;
}
else {
    iScale = LUMSCALE + 32
    if (LUMSHIFT > 31)
        iShift = LUMSHIFT * 64 - 64 * 64;
    else
        iShift = LUMSHIFT * 64;
}
// Build Look Up Tables
for (i = 0; i < MAX; i++)
{
    j = (iScale * i + iShift + 32) >> 6
    if (j > MAX)
        j = MAX
    else if (j < 0)
        j = 0
    LUTY[i] = j
    if( Single Color Space )
        LUTUV[i] = j
    else{
        j = (iScale * (i - HALF) + HALF * 64 + 32) >>6
        if (j > MAX)
            j = MAX
        else if (j < 0)
            j = 0
        LUTUV[i] = j
    }
}
```

The values for LUMSCALE and LUMSHIFT are set by the user, and information on the specified values is included in the bitstream generated by the entropy encoding unit 120.

Next, by using the set LUMSCALE and LUMSHIFT values, iScale and iShift values are generated. By using the generated iScale and iShift values, a lookup table, including correction pixel values corresponding to the pixel values of the previous image, respectively, is generated. By doing so, a lookup table (LUTY) in relation to the first color component and a lookup table (LUTUV) in relation to the remaining color components are generated. The method of generating the lookup tables will now be explained in more detail.

By using the generated iScale and iShift values, the lookup table (LUTY) including the correction pixel values in relation to the first color component is generated. Then, it is determined whether or not the image is a single color space. If it is the single color space, the lookup table (LUTUV) in relation to the color components other than the first color component is generated in the same manner as the generated lookup table in relation to the first color component.

If the image is a complex color space, by using the iScale and iShift values, correction pixel values are newly calculated, and by using the newly calculated correction pixel values, the lookup table (LUTUV) in relation to the color components other than the first color component is generated.

In the pseudo code, MAX is the maximum value that a pixel value of the image can have, and HALF is a half of the MAX. For example, when 8-bit image data is used, MAX is 256 and HALF is 128.

Figure 5:
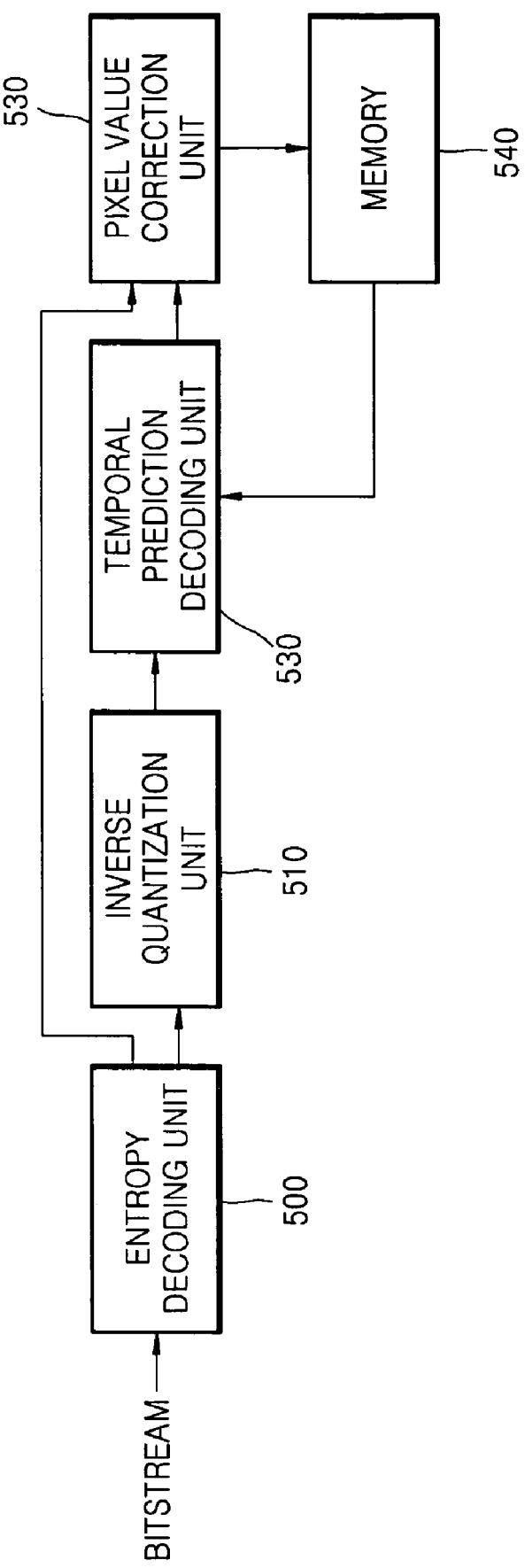
FIG. 5 is a block diagram of a structure of an image decoding apparatus according to an embodiment of the present invention.
Figure 6:
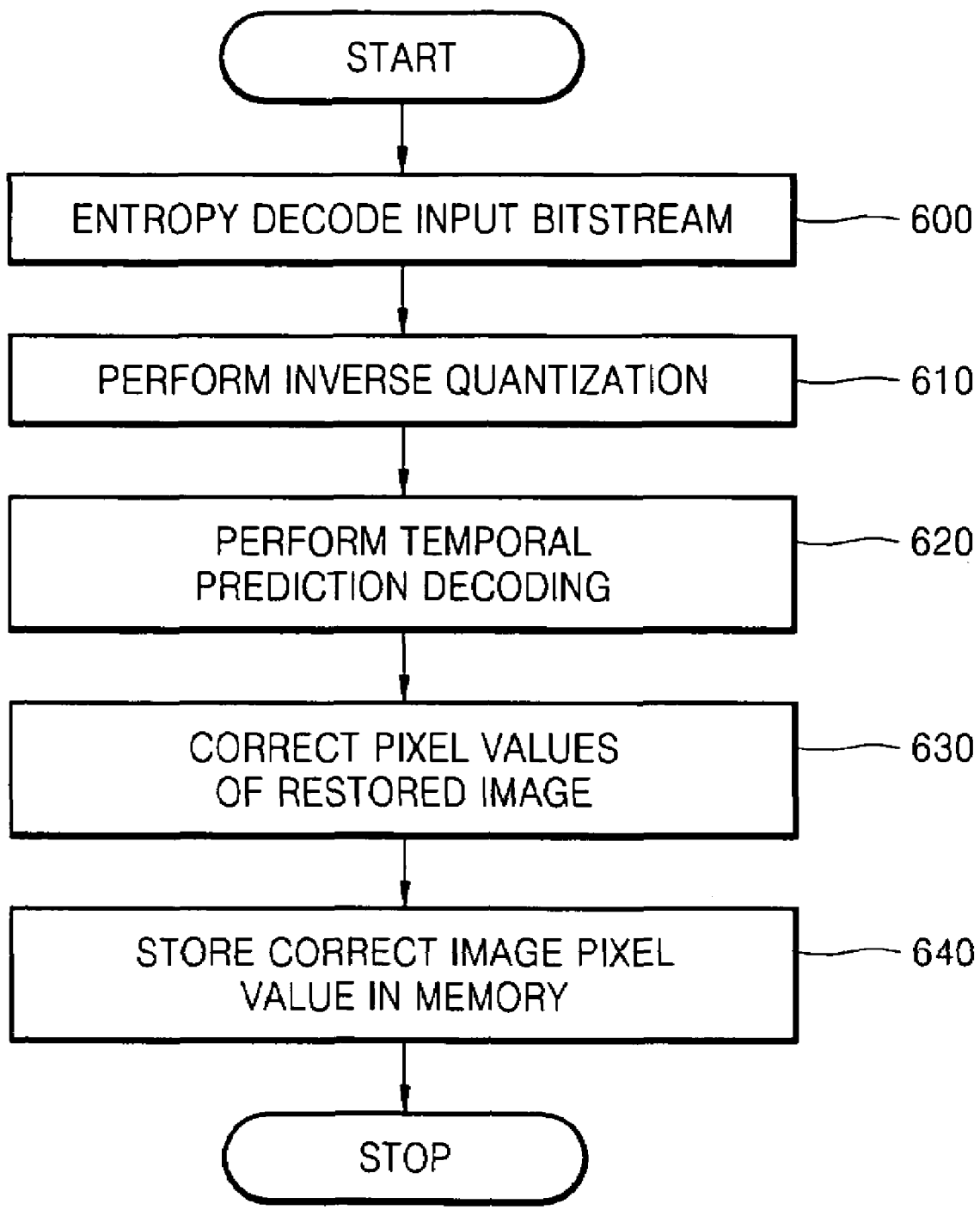
FIG. 6 is a flowchart of an image decoding method according to an embodiment of the present invention.

FIG. 5 is a block diagram of a structure of an image decoding apparatus according to an embodiment of the present invention. The decoding apparatus of FIG. 5 includes an entropy decoding unit 500, an inverse quantization unit 510, a temporal prediction decoding unit 520, a pixel value correction unit 530, and a memory 540. The operation of the decoding apparatus shown in FIG. 5 will now be explained with reference to a flowchart of an image decoding method according to an embodiment of the present invention shown in FIG. 6.

The entropy decoding unit 500 decodes an input bitstream and extracts encoded image data and encoding information in operation 600. The inverse quantization unit 510 inverse quantizes the extracted image data in operation 610. The temporal prediction decoding unit 520 restores image data, by adding the corrected pixel values of the previous image stored in the memory 540 to the inverse quantized data in operation 620.

For temporal prediction decoding of a next image, in operation 630, the pixel value correction unit 530 corrects the pixel values of the image that are temporal-prediction decoded and stores the result in the memory 540 in operation 640.

The pixel value correction unit 530 corrects the pixel value of the restored image in the same method as the pixel value correction performed in the image encoding.

The entropy decoding unit 500 extracts information on the proportional constant S and offset value C, and information on whether the color space of the image is a single color space or a complex color space, from the input bitstream. By using the information on the proportional constant S and offset value C, and information on whether the color space of the image is a single color space or a complex color space, input form the entropy decoding unit 500, the pixel value of the restored image may be corrected.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

In the image encoding and/or decoding apparatus according to the above-described embodiments, when the pixel values of a previous image are desired to be corrected in order to perform temporal prediction encoding, different pixel value correction methods are applied according to whether or not the characteristics of color components included in the color space of the image desired to be encoded. By doing so, when image data is encoded, the encoding can be performed adaptively to a variety of color spaces and higher compression efficiency can be maintained.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image pixel value correction method of correcting a pixel value of a previous image in order to perform temporal prediction encoding of a current image, the method comprising:

correcting a pixel value of a first color component among pixel values of the previous image using a first proportional constant and a first offset value;

determining whether a color space of the image is a single color space; and correcting a pixel value corresponding to a color component other than the first color component using the first proportional constant and the first offset value, when the color space of the image is a single color space, and correcting a pixel value corresponding to a color component other than the first color component using a second proportional constant and a second offset value, when the color space of the image is not a single color space, wherein the single color space is a color space having color components including a chrominance component and a luminance component.

2. The method of claim 1, wherein the second proportional constant is different from the first proportional constant.

3. The method of claim 1, wherein the second offset value is different from the first offset value.

4. The method of claim 1, wherein, when the color space of the image is a YCbCr or a YUV color space, the first color component is the Y component.

5. The method of claim 1, wherein, when the color space of the image is an RGB color space, the first color component is the G component.

6. The method of claim 1, wherein, in the determining of whether the color space of the image is a single color space, information on whether the color space of the image is a single color space is input by a user.

7. The method of claim 1, wherein, in the determining of whether the color space of the image is a single color space, the color space of the image is input by a user and it is determined whether the color space of the image is a single color space is input by a user.

8. The method of claim 1, wherein, in the determining of whether the color space of the image is a single color space, when the color space of the image is an RGB color space, it is determined that the color space of the image is a single color space.

9. The method of claim 1, wherein, in the determining of whether the color space of the image is a single color space, when the color space of the image is a YCbCr or a YUV color space, it is determined that the color space of the image is not a single color space.

10. The method of claim 1, wherein the correcting a pixel value of a first color component comprises:

generating correction pixel values using the first proportional constant and the first offset value; and correcting the pixel value of the first color component using the correction pixel values generated by using the first proportional constant and the first offset value.

11. The method of claim 10, wherein, in the correcting a pixel value of the color component other than the first color component, when the color space of the image is a single color space, the pixel value of the color component other than the first color component is corrected using the correction pixel values generated using the first proportional constant and the first offset value.

12. The method of claim 10, wherein the correcting a pixel value of the color component other than the first color component, when the color space of the image is not a single color space, comprises:

generating correction pixel values using the second proportional constant and the second offset value; and correcting the pixel value of the color component other than the first color component using the correction pixel values generated using the second proportional constant and the second offset value.

13. A computer readable recording medium having embodied thereon a computer program for executing the method of claim 1.

14. An image pixel value correction apparatus for correcting the pixel value of a previous image in order to perform temporal prediction encoding of a current image, the apparatus comprising:

a first correction value generation unit generating correction pixel values using a first proportional constant and a first offset value;

a color space determination unit determining whether the color space of the image is a single color space;

a second correction value generation unit generating correction pixel values using a second proportional constant and a second offset value, when the color space of the image is not a single color space; and a pixel value replacement unit replacing the pixel values of all the color components of the previous image with the correction pixel values generated in the first correction value generation unit, when the color space of the image is a single color space, and replacing the pixel values of the first color component with the correction pixel values generated in the first correction value generation unit and replacing the pixel values of the color components other than the first color component with the correction pixel values generated in the second correction value generation unit, when the color space of the image is not a single color space, wherein the single color space is a color space having color components including a chroma component and a luma component.

15. The apparatus of claim 14, wherein the second proportional constant is different from the first proportional constant.

16. The apparatus of claim 14, wherein the second offset value is different from the first offset value.

17. The apparatus of claim 14, wherein, when the color space of the image is a YCbCr or a YUV color space, the first color component is the Y component.

18. The apparatus of claim 14, wherein, when the color space of the image is an RGB color space, the first color component is the G component.

19. The apparatus of claim 14, wherein the color space determination unit receives an input of information on whether the color space of the image is a single color space, and determines whether the color space of the image is a single color space using the input information.

20. The apparatus of claim 14, wherein the color space determination unit receives an input of the color space of the image, and determines whether the color space of the image is a single color space.

21. The apparatus of claim 14, wherein, when the color space of the image is an RGB color space, the color space determination unit determines that the color space of the image is a single color space.

22. The apparatus of claim 14, wherein, when the color space of the image is a YCbCr or a YUV color space, the color space determination unit determines that the color space of the image is not a single color space.

23. An image encoding method of encoding an image by using temporal prediction encoding, the method comprising:

correcting pixel values by applying identical correction pixel values to all color components of a previous image, when a color space of an image is a single color space, and correcting pixel values by applying different correction pixel values to the color components of the previous image, when the color space of the image is not a single color space;

performing temporal prediction encoding of a current image using the corrected pixel values of the previous image to yield prediction encoded data;

quantizing the prediction encoded data to yield quantized data; and generating a bitstream by entropy encoding the quantized data, wherein the single color space is a color space having color components including a chroma component and a luma component.

24. The method of claim 23, wherein the correcting pixel values of the previous image comprises:

correcting the pixel value of a first color component among pixel values of the previous image using a first proportional constant and a first offset value;

determining whether the color space of the image is a single color space; and correcting a pixel value corresponding to a color component other than the first color component using the first proportional constant and the first offset value, when the color space of the image is a single color space, and correcting a pixel value corresponding to a color component other than the first color component using a second proportional constant and a second offset value, when the color space of the image is not a single color space.

25. The method of claim 24, wherein, in the determining whether the color space of the image is a single color space, when the color space of the image is an RGB color space, it is determined that the color space of the image is a single color space.

26. The method of claim 24, wherein, in the determining whether the color space of the image is a single color space, when the color space of the image is a YCbCr or a YUV color space, it is determined that the color space of the image is not a single color space.

27. The method of claim 24, wherein the correcting a pixel value of the first color component comprises:

generating correction pixel values using the first proportional constant and the first offset value; and correcting the pixel value of the first color component using the correction pixel values generated using the first proportional constant and the first offset value.

28. The method of claim 24, wherein, in the correcting a pixel value of the color component other than the first color component, when the color space of the image is a single color space, the pixel value of the color component other than the first color component is corrected using the correction pixel values generated using the first proportional constant and the first offset value.

29. The method of claim 24, wherein the correcting a pixel value of the color component other than the first color component, when the color space of the image is not a single color space, comprises:

generating correction pixel values using the second proportional constant and the second offset value; and correcting the pixel value of the color component other than the first color component using the correction pixel values generated using the second proportional constant and the second offset value.

30. The method of claim 23, wherein, when the color space of the image is a YCbCr or a YUV color space, the first color component is the Y component.

31. The method of claim 23, wherein, when the color space of the image is an RGB color space, the first color component is the G component.

32. The method of claim 23, wherein, in the generating a bitstream, encoding is performed so that information on whether the image is a single color space is included in the bitstream.

33. The method of claim 23, wherein, in the generating a bitstream, encoding is performed so that the first proportional constant and the first offset value are included in the bitstream.

34. The method of claim 23, wherein, in the generating a bitstream, when the image is not a single color space, encoding is performed so that the second proportional constant and the second offset value are included in the bitstream.

35. A computer readable recording medium having embodied thereon a computer program for executing the method of claim 23.

36. An image encoding apparatus for encoding an image using temporal prediction encoding, the apparatus comprising:

a pixel value correction unit correcting pixel values by applying identical correction pixel values to all color components of a previous image, when the color space of an image is a single color space, and correcting pixel values by applying different correction pixel values to the color components of the previous image, when the color space of the image is not a single color space;

a temporal prediction unit performing temporal prediction encoding of a current image using the corrected pixel values of the previous image to yield prediction encoded data;

a quantization unit quantizing the prediction encoded data to yield quantized data; and an entropy encoding unit generating a bitstream by entropy encoding the quantized data, wherein the single color space is a color space having color components including a chroma component and a luma component.

37. The apparatus of claim 36, wherein the pixel value correction unit comprises:

a first correction value generation unit generating correction pixel values using a first proportional constant and a first offset value;

a color space determination unit determining whether the color space of the image is a single color space;

a second correction value generation unit generating correction pixel values by using a second proportional constant and a second offset value, when the color space of the image is not a single color space; and a pixel value replacement unit replacing the pixel values of all the color components of the previous image, with the correction pixel values generated in the first correction value generation unit, when the color space of the image is a single color space, and replacing the pixel values of the first color component with the correction pixel values generated in the first correction value generation unit and replacing the pixel values of the color components other than the first color component with the correction pixel values generated in the second correction value generation unit, when the color space of the image is not a single color space.

38. The apparatus of claim 37, wherein, when the color space of the image is a YCbCr or a YUV color space, the first color component is the Y component.

39. The apparatus of claim 37, wherein, when the color space of the image is an RGB color space, the first color component is the G component.

40. The apparatus of claim 37, wherein, when the color space of the image is an RGB color space, the color space determination unit determines that the color space of the image is a single color space.

41. The apparatus of claim 37, wherein, when the color space of the image is a YCbCr or a YUV color space, the color space determination unit determines that the color space of the image is not a single color space.

42. The apparatus of claim 37, wherein the entropy encoding unit performs encoding so that information on whether the image is a single color space is included in the bitstream.

43. The apparatus of claim 37, wherein the entropy encoding unit performs encoding so that the first proportional constant and the first offset value are included in the bitstream.

44. The apparatus of claim 36, wherein, when the image is not a single color space, the entropy encoding unit performs encoding so that the second proportional constant and the second offset value are included in the bitstream.

45. An image decoding method of decoding an image from an input bitstream, the method comprising:
  entropy decoding the bitstream to yield entropy decoded data;
  inverse quantizing the entropy decoded data to yield inverse quantized data;
  correcting pixel values by applying identical correction pixel values to all color components of a previous image, when the color space of an image is a single color space, and correcting pixel values by applying different correction pixel values to the color components of the previous image, when the color space of the image is not a single color space; and
  performing temporal prediction decoding of data corresponding to a current image among the inverse quantized data using the corrected pixel values of the previous image,
  wherein the single color space is a color space having color components including a chroma component and a luma component.

46. The method of claim 45, wherein the correcting pixel values of the previous image comprises:
  correcting the pixel value of a first color component among pixel values of the previous image using a first proportional constant and a first offset value;
  determining whether the color space of the image is a single color space; and
  correcting a pixel value corresponding to a color component other than the first color component using the first proportional constant and the first offset value, when the color space of the image is a single color space, and correcting a pixel value corresponding to a color component other than the first color component using a second proportional constant and a second offset value, when the color space of the image is not a single color space.

47. The method of claim 46, wherein, when the color space of the image is a YCbCr or a YUV color space, the first color component is the Y component.

48. The method of claim 46, wherein, when the color space of the image is an RGB color space, the first color component is the G component.

49. The method of claim 46, wherein, in the determining whether the color space of the image is a single color space, when the color space of the image is an RGB color space, it is determined that the color space of the image is a single color space.

50. The method of claim 46, wherein, in the determining whether the color space of the image is a single color space, when the color space of the image is any one of YCbCr and YUV color spaces, it is determined that the color space of the image is not a single color space.

51. The method of claim 46, wherein, in the determining whether the color space of the image is a single color space, information on whether the color space of the image is a single color space, included in the entropy decoded data, is used.

52. The method of claim 46, wherein information on the first proportional constant and the first offset value is included in the entropy decoded data.

53. The method of claim 46, wherein information on the second proportional constant and the second offset value is included in the entropy decoded data.

54. A computer readable recording medium having embodied thereon a computer program for executing the method of claim 45.

55. An image decoding apparatus of decoding an image from an input bitstream, the method comprising:
  an entropy decoding unit entropy decoding the bitstream to yield entropy decoded data;
  an inverse quantization unit inverse quantizing the entropy decoded data to yield inverse quantized data;
  a pixel value correction unit correcting pixel values by applying identical correction pixel values to all color components of a previous image, when the color space of an image is a single color space, and correcting pixel values by applying different correction pixel values to the color components of the previous image, when the color space of the image is not a single color space; and
  a temporal prediction decoding unit, performing temporal prediction decoding of data corresponding to a current image among the inverse quantized data using the corrected pixel values of the previous image,
  wherein the single color space is a color space having color components including a chroma component and a luma component.

56. The apparatus of claim 55, wherein the pixel value correction unit comprises:
  a first correction value generation unit generating correction pixel values using a first proportional constant and a first offset value;
  a color space determination unit determining whether the color space of the image is a single color space;
  a second correction value generation unit generating correction pixel values using a second proportional constant and a second offset value, when the color space of the image is not a single color space; and
  a pixel value replacement unit replacing the pixel values of all the color components of the previous image, with the correction pixel values generated in the first correction value generation unit, when the color space of the image is a single color space, and replacing the pixel values of the first color component with the correction pixel values generated in the first correction value generation unit and replacing the pixel values of the color components other than the first color component with the correction pixel values generated in the second correction value generation unit, when the color space of the image is not a single color space.

57. The apparatus of claim 56, wherein, when the color space of the image is a YCbCr or a YUV color space, the first color component is the Y component.

58. The apparatus of claim 56, wherein, when the color space of the image is an RGB color space, the first color component is the G component.

59. The apparatus of claim 56, wherein, when the color space of the image is an RGB color space, the color space determination unit determines that the color space of the image is a single color space.

60. The apparatus of claim 56, wherein, when the color space of the image is a YCbCr or a YUV color space, the color space determination unit determines that the color space of the image is not a single color space.

61. The apparatus of claim 56, wherein the color space determination unit determines whether the color space of the image is a single color space using information included in the entropy decoded data.

62. The apparatus of claim 56, wherein information on the first proportional constant and the first offset value is included in the entropy decoded data.

63. The apparatus of claim 56, wherein information on the second proportional constant and the second offset value is included in the entropy decoded data.

* * * * *